United States Patent [19]

Freund et al.

[11] 3,996,120

[45] Dec. 7, 1976

[54] LASER-INDUCED PHOTOCHEMICAL ENRICHMENT OF BORON ISOTOPES

[75] Inventors: Samuel M. Freund, Gaithersburg; Joseph J. Ritter, Mount Airy, both of Md.

[73] Assignee: The United States of America as represented by the Secretary of Commerce, Washington, D.C.

[22] Filed: Jan. 12, 1976

[21] Appl. No.: 648,346

[52] U.S. Cl. ............... 204/157.1 R; 204/DIG. 11; 423/292; 423/659
[51] Int. Cl.² ................... B01J 1/10; C01B 35/06
[58] Field of Search ............ 204/157.1 R, DIG. 11; 423/292, 659 K

[56] References Cited

UNITED STATES PATENTS 3,937,956  2/1976  Lyon ........................ 204/157.1 R

OTHER PUBLICATIONS

Ambartzumian et al., JETP Letters, vol. 21, Mar. 20, 1975, pp. 375–378.

Primary Examiner—Howard S. Williams
Attorney, Agent, or Firm—Eugene J. Pawlikowski; Alvin J. Englert

[57] ABSTRACT

A boron trichloride starting material containing both boron-10 isotopes and boron-11 isotopes is selectively enriched in one or the other of these isotopes by a laser-induced photochemical method involving the reaction of laser-excited boron trichloride with either $H_2S$ or $D_2S$. The method is carried out by subjecting a low pressure gaseous mixture of boron trichloride starting material and the sulfide to infrared radiation from a carbon dioxide TE laser. The wave length of the radiation is selected so as to selectively excite one or the other of boron-10 $BCl_3$ molecules or boron-11 $BCl_3$ molecules, thereby making them preferentially more reactive with the sulfide. The laser-induced reaction produces both a boron-containing solid phase reaction product and a gaseous phase containing mostly unreacted $BCl_3$ and small amounts of sulfhydroboranes. Pure boron trichloride selectively enriched in one of the isotopes is recovered as the primary product of the method from the gaseous phase by a multi-step recovery procedure. Pure boron trichloride enriched in the other isotope is recovered as a secondary product of the method by the subsequent chlorination of the solid phase reaction product followed by separation of $BCl_3$ from the mixture of gaseous products resulting from the chlorination.

14 Claims, 1 Drawing Figure

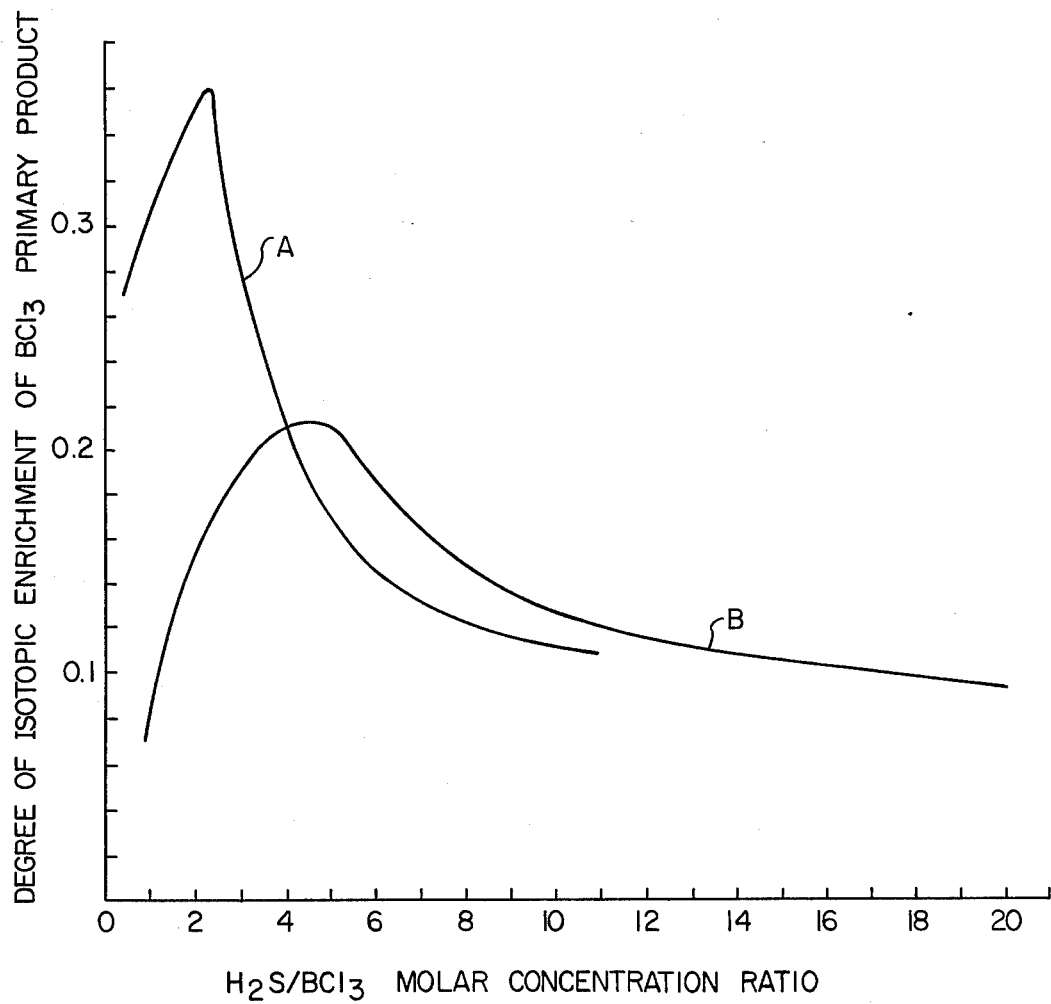

LASER-INDUCED PHOTOCHEMICAL ENRICHMENT OF BORON ISOTOPES

BACKGROUND OF THE INVENTION

This invention relates to boron isotope enrichment, and, more particularly, to a laser-induced photochemical method for the selective enrichment of either boron-10 or boron-11 isotopes.

There has been much recent interest in the development of various methods of isotope separation and enrichment. Although efforts along these lines have primarily been directed to the separation of uranium isotopes for nuclear fuels in the hope of achieving a method more economical than the very expensive ones currently used, pure or enriched isotopes and isotopic compounds of the lighter elements, such as boron and chlorine, are also much needed, for example, as tracer materials for medical research and diagnosis, biological research, and environmental studies.

A number of previously proposed isotope separation and enrichment methods have utilized laser radiation for selectively exciting particular isotopes or isotope-containing molecules. The selectively excited isotopic species must then be removed before it has a change to decay back to the ground state or be involved in energy transfer collisions with other isotopic species. Such laser-initiated procedures up to now have been, for the most part, photophysical in nature, wherein one- or multi-photon processes photodissociate molecules or photoionize or deflect atoms, all being unimolecular processes. The principal disadvantage of these photophysical processes has been their inherent overall low efficiency. Although attempts have beem made to improve the efficiency of laser-induced isotope separation and enrichment through the use of photochemical techniques whereby the selectively excited isotopic species is removed by chemical reaction with a reactant added to the system, such attempts heretofore have not resulted in stable reaction products being formed and have failed to achieve appreciable yields of isotopically enriched materials.

Photochemical isotope enrichment techniques are based on two main phenomena. First, there is the fact that the wave lengths of spectral lines absorbed by a molecule depend somewhat on the isotopes present in the molecule. Second, the rate of a chemical reaction is sometimes influenced by the state of excitation of the participating molecules. Although the precise mechanisms of the latter process are not very well understood, educated guesses can occasionally be made as to which excitations are likely to accelerate a given reaction. In order for photochemical isotope enrichment to be possible with a given starting material, several conditions must be satisfied. First of all, the effect of isotopic content of the starting material on the wave lengths of one or more of its spectral lines must be large enough so that one type of isotope-containing molecule could be preferentially excited by absorbing laser radiation which would not excite the other types of isotope-containing molecules. Secondly, a laser is needed whose radiation happens to match in wave length one of the isotope-dependent lines, or a laser that can be tuned to such a wave length, and the spectral width of the laser radiation must be narrow enough to excite molecules containing one of the isotopes and not the others. Thirdly, the isotope-containing starting compound must be capable of being mixed with other substances with which it is known to react fairly slowly, but which can be made to react more rapidly when one of the isotopic species is selectively excited by the radiation chosen. Fourthly, transfer of excitation from one molecule to another by collision, and "scrambling" of isotopes through collision of reaction products with other reactive species (for example, free radicals) present, must be negligible, since both of these factors tend to reduce the selectivity of the overall process.

SUMMARY OF THE INVENTION

It is accordingly a primary object of the present invention to provide a laser-induced photochemical method for the enrichment of boron isotopes in a starting material containing both boron-10 and boron-11 isotopes, which satisfies all of the aforementioned four conditions.

Another object of the present invention is to provide a laser-induced photochemical method for the enrichment of boron isotopes in accordance with the preceding object, which permits selectivity in enriching either the boron-10 or boron-11 isotopic content of the starting material.

A further object of the present invention is to provide a laser-induced photochemical method for the selective enrichment of either the boron-10 or boron-11 isotopic content of a boron-containing starting material, wherein the reaction products resultant from the process are relatively stable.

Still another object of the present invention is to provide a laser-induced photochemical method for the selective enrichment of either the boron-10 or boron-11 isotopic content of a boron-containing starting material, which results in appreciable yields of the isotopically enriched product.

A still further object of the present invention is to provide a laser-induced photochemical method for the selective enrichment of either the boron-10 or boron-11 isotopic content of a boron-containing starting material in accordance with preceding objects, which further allows recovery of a primary product selectively enriched in one of the isotopes, and a secondary product enriched in the other isotope.

The above and other objects are achieved in accordance with the method of the present invention, which employs as a starting material boron trichloride, which is well-known for its strong interactions with carbon dioxide laser radiation, including, under appropriate conditions, the appearance of visible luminescence under the influence of such radiation. Many P-and R-branch emission lines of the 001-100 band of the carbon dioxide laser coincide with the B-Cl stretching transition in boron-11 $BCl_3$ molecules and boron -10 $BCl_3$ molecules, respectively. The photochemical method of the present invention utilizes a normally very slow reaction between boron trichloride and either $H_2S$ or $D_2S$. The method is carried out by subjecting a low pressure gaseous mixture of boron trichloride and either $H_2S$ or $D_2S$ to infrared radiation from a carbon dioxide TE laser. The wave length of the radiation is selected so as to coincide with the B-Cl stretching transition in either the boron-10 $BCl_3$ molecules or the boron-11 $BCl_3$ molecules, thereby selectively exciting that species of $BCl_3$ molecules and making it preferentially more reactive with the sulfide. The irradiation of the gaseous mixture is continued for a period of time sufficient to form in the reaction chamber siginificant amounts of a boron-containing solid phase reaction product, whereupon the resulting gaseous phase in the reaction chamber will contain mostly unreacted $BCl_3$ and small amounts of sulfhydroboranes in admixture with other gases. Subsequent separate treatment of each of these two phases results in the recovery of appreciable yields of two different stable isotopically enriched boron trichloride final products. Pure boron trichloride selectively enriched in either the boron-10 isotope or the boron-11 isotope, hereinafter referred to as the "boron trichloride primary product," is recovered from the gaseous phase by a multi-step recovery procedure wherein the sulfhydroboranes are chlorinated and the resulting $BCl_3$ together with the unreacted $BCl_3$ are separated from the gaseous impurities. Pure boron trichloride enriched in the other isotope, hereinafter referred to as the "boron trichloride secondary product," is obtained from the solid phase reaction product by chlorination thereof to form a $BCl_3$-containing mixture of gaseous products, followed by separation of the $BCl_3$ therefrom.

BRIEF DESCRIPTION OF THE DRAWINGS

The invention is illustrated by way of example in the accompanying drawings, the sole FIGURE of which is a graph showing the manner in which the degree of isotopic enrichment of the boron trichloride primary product recovered from the gaseous phase resulting from the method of the present invention when $H_2S$ is used as the sulfide reactant, varies with the $H_2S$ to $BCl_3$ molar concentration ratio in the starting gaseous mixture, for two different wavelengths of carbon dioxide TE laser radiation.

DESCRIPTION OF PREFERRED EMBODIMENTS

The starting material employed in the method of the present invention is boron trichloride, which has a measured ratio of boron-10 $BCl_3$ molecules to boron-11 $BCl_3$ molecules of $0.242 \pm 0.002$. The terrestrial boron-10 to boron-11 ratio depends upon the source of the boron. In carrying out the method of the present invention, a gaseous mixture of the boron trichloride starting material and a sulfide selected from the group consisting of $H_2S$ and $D_2S$, is formed at a reduced pressure in a closed reaction chamber, for example, a spherical cell. The ratio of the partial pressure of the sulfide to the partial pressure of the boron trichloride in the gaseous mixture, and hence the corresponding molar concentration ratio, may vary from 1 to 10, with the partial pressure of the boron trichloride preferably being about 2 torr, and the partial pressure of the sulfide preferably being within the range of from 2–20 torr.

The gaseous mixture is then irradiated with infrared radiation from a carbon dioxide TE laser, with the laser beam preferably focussed at the center of the reaction chamber to minimize wall reactions, which could undo the effects of the radiation. For good results, the laser may be operated at 10 pulses per second, with each pulse having a duration of less than 300 nanoseconds and carrying at least 0.1 joule of energy. The wavelength of the radiation is selected so as to coincide with the B-Cl stretching transition in either the boron-10 $BCl_3$ molecules or the boron-11 $BCl_3$ molecules, thereby selectively exciting that species of $BCl_3$ molecules and making it preferentially more reactive with the sulfide. For example, radiation at a wavelength of 10.18 $\mu$m corresponding to the R(30) line of the 001-100 band of the carbon dioxide laser, coincides with the B-Cl stretching transition in the boron-10 $BCl_3$ molecules and selectively excites that species of $BCl_3$ molecules; whereas radiation at a wavelength of 10.55 $\mu$m corresponding to the P(16) line of the 001-100 band of the carbon dioxide laser, coincides with the B-Cl stretching transition in the boron-11 $BCl_3$ molecules and selectively excites that species of $BCl_3$ molecules.

The irradiation of the gaseous mixture is continued for a period of time sufficient to form significant quantities of a solid phase reaction product in the reaction chamber. The irradiation time varies with the particular wavelength of radiation employed, about five hours being preferred with the 10.18 $\mu$m wavelength radiation, and about ten hours being preferred with the 10.55 $\mu$m wavelength radiation. The solid phase reaction product accumulates on the walls of the reaction chamber, and at the conclusion of photolysis, the resulting gaseous phase in the reaction chamber, which contains mostly reacted boron trichloride and small amounts of sulfhydroboranes in admixture with other gases, is separated from the solid phase reaction product, which also contains boron.

Pure boron trichloride is recovered as the primary product of the method of the present invention from the gaseous phase by the following recovery procedure. Fractionation at −130° C provides a borane-containing fraction comprised primarily of the unreacted $BCl_3$ in admixture with small quantities of sulfhydroboranes, such as $HSBCl_2$ and $(HS)_2BCl$. This fraction is then chlorinated with gaseous $Cl_2$, preferably at 25° C for about 18 hours, to form a mixture of gaseous products containing the unreacted $BCl_3$, additional $BCl_3$ resulting from chlorination of the sulfhydroboranes, $SCl_2$ and HCl. This mixture of gaseous products is then fractionated at −130° C to obtain a $BCl_3$—$SCl_2$ fraction, from which the $SCl_2$ is extracted with mercury, the mercury extraction preferably being carried out at 25° C for about 18 hours, thereby leaving the boron trichloride primary product.

Pure boron trichloride is also obtained as a secondary product of the method of the present invention from the solid phase reaction product by first chlorinating the solid phase reaction product in the reaction chamber with $Cl_2$ gas, preferably at 25° C for about 72 hours at a $Cl_2$ gas pressure of about 150 torr. to form a mixture of gaseous products containing $BCl_3$, $SCl_2$ and HCl. This mixture of gaseous products is then fractionated at −115° C to obtain a $BCl_3$—$SCl_2$ fraction, from which the $SCl_2$ is extracted with mercury, the mercury extraction preferably being carried out at 25° C for about 18 hours, thereby leaving the boron trichloride secondary product.

The resulting boron trichloride primary product recovered from the gaseous phase in the reaction chamber is selectively enriched in either the boron-10 isotope or the boron-11 isotope, while the resulting boron trichloride secondary product obtained from treating the solid phase reaction product formed in the reaction chamber is enriched in the opposite isotope. The selectivity in the isotopic enrichment is determined by one or both of two factors, namely, the particular wavelength of laser radiation employed in carrying out the process, and the particular sulfide reactant employed in carrying out the process. When the process is carried out employing laser radiation having a wavelength of 10.18 $\mu$m corresponding to the R(30) line of the 001-100 band of the carbon dioxide laser, thereby selectively exciting the boron-10 isotopic species of $BCl_3$ molecules, the excited species preferentially reacts with the sulfide reactant, whether it be $H_2S$ or $D_2S$, and ultimately forms the solid phase reaction product. In this case, the boron trichloride primary product recovered from the resulting gaseous phase in the reaction chamber is selectively enriched in the boron-11 isotope, while the boron trichloride secondary product obtained from the solid phase reaction product is enriched in the boron-10 isotope. On the other hand, when the process is carried out employing laser radiation having a wavelength of 10.55 $\mu$m corresponding to the P(16) line of the 001-100 band of the carbon dioxide laser, thereby selectively exciting the boron-11 isotopic species of $BCl_3$ molecules, the isotopic enrichment, for reasons not yet thoroughly understood, is dependent upon the particular sulfide reactant employed in the process. When the sulfide reactant is $H_2S$, the reaction mechanism proceeds as would be expected and the excited species of boron-11 $BCl_3$ molecules is caused to preferentially react with the sulfide, ultimately forming the solid phase reaction product. In this case, the boron trichloride primary product recovered from the resulting gaseous phase in the reaction chamber is selectively enriched in the boron-10 isotope, while the boron trichloride secondary product obtained from the solid phase reaction product is enriched in the boron-11 isotope. However, when $D_2S$ is used as the sulfide reactant with laser radiation having a wavelength of 10.55 $\mu$m, the isotopic enrichment is reversed from what would be expected, and the boron trichloride primary product recovered from the resulting gaseous phase in the reaction chamber is selectively enriched in the boron-11 isotope, while the boron trichloride secondary product obtained from the solid phase reaction product is enriched in the boron-10 isotope.

The degree of the isotopic enrichment obtained by means of the present invention varies with the sulfide to $BCl_3$ molar concentration ratio in the starting gaseous mixture as well as with the irradiation wavelength. This can be seen from the graph in the accompanying drawing which shows the effect of the sulfide to boron trichloride molar concentration ratio in the starting gaseous mixture, on the degree of isotopic enrichment of the boron trichloride primary product recovered from the gaseous phase resulting from the method of the present invention when $H_2S$ is used as the sulfide reactant. The ordinate of the graph, which is in relative units, is obtained by dividing the magnitude of the difference between the enriched boron-10/boron-11 isotopic ratio and that of the boron trichloride starting material, by the extent of reaction determined from the amount of $BCl_3$ consumed. Line A represents the results obtained when the irradiation is carried out for five hours at a laser radiation wavelength of 10.18 $\mu$m corresponding to the R(30) line of the 001-100 band of the carbon dioxide laser, and line B represents the results obtained when the irradiation is carried out for ten hours at a laser radiation wavelength of 10.55 $\mu$m corresponding to the P(16) line of the 001-100 band of the carbon dioxide laser. The conditions of line A produce a relative decrease in the boron-10/boron-11 isotopic ratio which, as shown in the graph, is greatest when the molar ratio of sulfide to boron trichloride in the starting gaseous mixture is about 2:1. The conditions of line B produce a relative increase in the boron-10/boron-11 isotopic ratio which, as shown in the graph, is greatest when the molar ratio of a sulfide to boron trichloride in the starting gaseous mixture is about 5:1.

The method of the present invention may lend itself to recycling in order to obtain higher isotopic enrichments. That is, the isotopically enriched boron trichloride products resulting from the method of the present invention could be used as starting materials for a repetition of the process. By using several such cumulative stages, each of which increases the relative abundance of one of the isotopes, higher concentrations of that isotope could be obtained.

The method of the present invention is further illustrated by way of the following examples.

EXAMPLE I

A gaseous mixture of boron trichloride having a boron-10 to boron-11 isotopic ratio of 0.242 ± 0.002, and $H_2S$, at a molar ratio of $H_2S$ to $BCl_3$ of 5:1, was formed by admitting gaseous $BCl_3$ at a pressure of 2 torr and gaseous $H_2S$ at a pressure of 10 torr to an approximately spherical cell of 10 centimeter diameter. The output from a commerical carbon dioxide TE laser, operating at 10 pulses per second, each pulse having a duration of 300 nanoseconds and carrying about 0.1 joule of energy, at a wave length of 10.55 $\mu$m corresponding to the P(16) line of the 001-100 band of the laser, was focussed at the center of the cell by means of a 25 cm focal length $BaF_2$ lens to minimize wall reactions. Irradiation was carried out for a period of ten hours, at the conclusion of which the cell contained a gaseous phase, principally unreacted $BCl_3$, and an involatile white solid reaction product which was formed on the cell walls.

The gaseous phase species were removed from the cell and standard vacuum system techniques were used to fractionate this phase through traps maintained at −63° C, −130° C and −196° C. No materials could be detected in the −63° C trap, while a mixture of primarily unreacted $BCl_3$, $H_2S$, and small quantities of sulfhydroboranes was retained at the −130° C trap. The −196° C fraction contained $H_2S$ and HCl. The composition of each fraction was determined using infrared spectrophotometry and mass spectroscopy. The extent of reaction was estimated to be about 88 percent from gas volume measurements on the −130° C fraction, assuming that this fraction was essentially boranes and $H_2S$ in a 1:1 ratio. Mass spectroscopic determinations of the boron-10/boron-11 isotopic ratio were also made on the −130° C fraction, and the results indicated this ratio to be 0.413 ± 0.004. The boron-10 isotopic concentration had thus been increased from 19.5 percent in the boron trichloride starting material to 29.2 percent in the resulting gaseous phase product.

The isotopically enriched $BCl_3$ was recovered from the −130° C fraction by treating this fraction in gas phase with $Cl_2$ gas at 25° C for 48 hours, which gave a mixture of $BCl_3$, $SCl_2$ and HCl. Trap to trap fractionation of this mixture gave $BCl_3$ and $SCl_2$ (−130° C), and HCl (−196° C). The $SCl_2$ was removed from the $BCl_3$—$_{SCl_2}$ mixture by treatment with mercury at 25° C for 18 hours, thereby leaving the isotopically enriched $BCl_3$ primary product.

A boron trichloride secondary product was obtained from the solid reaction product which had formed on the cell walls by first treating the cell with $Cl_2$ gas at a pressure of about 150 torr at 25° C for 72 hours. At the end of this time the white solids had disappeared from the cell walls, and the volatile materials were separated by fractionation through traps held at −63° C (no retention), −115° C ($BCl_3$ and $SCl_2$), and −196° C (unreacted $Cl_2$ and HCl). Mass spectrometric determination of the boron-10/boron-11 isotopic ratio in the −115° C fraction showed an enrichment in boron-11 isotopes as compared with the boron trichloride starting material. Again the $BCl_3$—$SCl_2$ mixture was freed of $SCl_2$ by treatment with mercury at 25° C for 18 hours, thereby leaving the isotopically enriched boron trichloride secondary product.

Thus it can be seen that the method of the present invention permits the recovery and isolation of useful quantities of $BCl_3$ selectively enriched in each boron isotope.

EXAMPLE II

The procedure of Example I, above, was repeated, substituting $D_2S$ for the $H_2S$ in the starting gaseous mixture. The extent of reaction was estimated to be 87 percent. The boron-10/boron-11 isotopic ratio in the boron trichloride primary product recovered from the gaseous phase in the cell was determined to be 0.193, a reduction from the 0.242 isotopic ratio in the boron trichloride starting material, and hence an enrichment in the boron-11 isotope. Correspondingly, the boron trichloride secondary product obtained from the solid reaction product formed in the cell was enriched in the boron-10 isotope.

EXAMPLE III

The procedure of Example I, above, was repeated, but with the following changes. First of all, the $H_2S$ admitted to the cell in forming the starting gaseous mixture was at a pressure of 2 torr, thereby providing a molar ratio of $H_2S$ to $BCl_3$ of 1:1. Secondly, the laser was operated at a radiation wavelength of 10.18 μm corresponding to the R(30) line of the 001-100 band of the laser. Thirdly, the irradiation was carried out for a period of five hours. The boron-10/boron-11 isotopic ratio in the boron trichloride primary product recovered from the resulting gaseous phase in the cell was determined to be 0.169 ± 0.002, a reduction from the 0.242 isotopic ratio in the boron trichloride starting material, and hence an enrichment in the boron-11 isotope. Correspondingly, the boron trichloride secondary product obtained from the solid reaction product formed on the cell walls was enriched in the boron-10 isotope.

EXAMPLE IV

The procedure of Example III, above, was repeated, substituting $D_2S$ for the $H_2S$ in the starting gaseous mixture. Isotopic enrichment results, in both the boron trichloride primary product recovered from the resulting gaseous phase in the cell and the boron trichloride secondary product obtained from the solid reaction product formed on the walls of the cell, similar to Example III were obtained.

EXAMPLE V

The procedure of Example III, above, was repeated, but with the $H_2S$ admitted to the cell in forming the starting gaseous mixture being at a pressure of 4 torr, thereby providing a molar ratio of $H_2S$ to $BCl_3$ of 2:1. The extent of reaction was estimated to be 17 percent. The boron-10/boron-11 isotopic ratio in the boron trichloride primary product recovered from the resulting gaseous phase in the cell was determined to be 0.184, a decrease from the 0.242 isotopic ratio in the boron trichloride starting material, and hence an enrichment in the boron-11 isotope. Correspondingly, the boron trichloride secondary product obtained from the solid reaction product formed on the cell walls was enriched in the boron-10 isotope.

EXAMPLE VI

The procedure of Example V, above, was repeated, substituting $D_2S$ for the $H_2S$ in the starting gaseous mixture. Isotopic enrichment results, in both the boron trichloride primary product recovered from the resulting gaseous phase in the cell and the boron trichloride secondary product obtained from the solid reaction product formed on the walls of the cell, similar to Example V were obtained.

The embodiments of the invention in which exclusive property or privilege is claimed are defined as follows:
1. A photochemical method for the selective enrichment of either boron-10 isotopic content or boron-11 isotopic content of boron trichloride starting material containing a first species of $BCl_3$ molecules wherein the boron atoms are boron-10 and a second species of $BCl_3$ molecules wherein the boron atoms are boron-11, comprising the steps of:
   a. forming a gaseous mixture at a reduced pressure in a closed reaction chamber of said boron trichloride starting material and a sulfide selected from the group consisting of $H_2S$ and $D_2S$;
   b. irradiating said gaseous mixture with infrared radiation from a carbon dioxide TE laser, the wavelength of said radiation selectively coinciding with the B-Cl stretching transition in one of said first or second species of $BCl_3$ molecules, thereby selectively exciting said one species of $BCl_3$ molecules and making it preferentially more reactive with said sulfide;
   c. continuing said irradiation of said gaseous mixture for a period of time sufficient to form a solid reaction product in said reaction chamber; and
   d. recovering from the resulting gaseous phase in said reaction chamber a boron trichloride primary product selectively enriched in either the boron-10 isotope or the boron-11 isotope.
2. The method of claim 1, wherein the partial pressure of said boron trichloride starting material in said gaseous mixture is 2 torr. and the partial pressure of said sulfide in said gaseous mixture is within the range of from 2–20 torr.
3. The method of claim 1, wherein said irradiation is carried out with said laser operating at 10 pulses per second, each pulse having a duration of 300 nanoseconds and carrying about 0.1 joule of energy.
4. The method of claim 1, wherein said boron trichloride primary product is recovered from said gaseous phase remaining in said reaction chamber by fractionating said gaseous phase at −130° C to obtain a borane-containing fraction comprising primarily unreacted $BCl_3$ in admixture with small quantities of sulfhydroboranes; chlorinating said borane-containing fraction with gaseous $Cl_2$ to form a mixture of gaseous products containing $BCl_3$, $SCl_2$ and HCl; fractionating said mixture of gaseous products at −130° C to obtain a $BCl_3$—$SCl_2$ fraction; and extracting the $SCl_2$ from said $BCl_3$—$SCl_2$ fraction with mercury to obtain said pure boron trichloride primary product.

5. The method of claim 4, wherein said chlorination is carried out at 25° C for 48 hours, and said mercury extraction is carried out at 25° C for 18 hours.

6. The method of claim 1, including the further step of:
   e. obtaining from said solid reaction product formed in said reaction chamber a boron trichloride secondary product selectively enriched in either the boron-10 isotope or the boron-11 isotope, the boron isotope enrichment in said boron trichloride secondary product being opposite to that in said boron trichloride primary product.

7. The method of claim 6, wherein said boron trichloride secondary product is obtained from said solid reaction product by chlorinating said solid reaction product with $Cl_2$ gas to form a mixture of gaseous products containing $BCl_3$, $SCl_2$ and $HCl$; fractionating said mixture of gaseous products at at −115° C to obtain a $BCl_3$—$SCl_2$ fraction; and extracting the $SCl_2$ from said $BCl_3$—$SCl_2$ fraction with mercury to obtain said boron trichloride secondary product.

8. The method of claim 7, wherein said chlorination is carried out at 25° C for 72 hours at a $Cl_2$ gas pressure of about 150 torr, and said mercury extraction is carried out at 25° C for 18 hours.

9. The method of claim 1, wherein said irradiation is carried out for at least about 5 hours with the wavelength of said radiation being 10.18 μm corresponding to the R(30) line of the 001-100 band of the carbon dioxide laser, thereby selectively exciting said first species of $BCl_3$ molecules wherein the boron atoms are boron-10 and causing them to preferentially react with said sulfide, and said boron trichloride primary product recovered from the resulting gaseous phase in said reaction chamber is selectively enriched in the boron-11 isotope.

10. The method of claim 9, wherein the molar ratio of sulfide to boron trichloride starting material in said gaseous mixture is about 2:1.

11. The method of claim 1, wherein said irradiation is carried out for at least about 10 hours, with the wavelength of said radiation being 10.55 μm corresponding to the P(16) line of the 001-100 band of the carbon dioxide laser, thereby selectively exciting said second species of $BCl_3$ molecules wherein the boron atoms are boron-11.

12. The method of claim 11, wherein the molar ratio of sulfide to boron trichloride starting material in said gaseous mixture is about 5:1.

13. The method of claim 11, wherein said sulfide is $H_2S$, and said boron trichloride primary product recovered from the resulting gaseous phase in said reaction chamber is selectively enriched in the boron-10 isotope.

14. The method of claim 11, wherein said sulfide is $D_2S$, and said boron trichloride primary product recovered from the resulting gaseous phase in said reaction chamber is selectively enriched in the boron-l11 isotope.

* * * * *